United States Patent
Cherukumudi et al.

(10) Patent No.: US 8,875,243 B1
(45) Date of Patent: Oct. 28, 2014

(54) IDENTITY ABSTRACTION PROVIDING LIMITED CROSS-DOMAIN ACCESS

(75) Inventors: Vijaykumar Cherukumudi, Overland Park, KS (US); David K. Fultz, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 604 days.

(21) Appl. No.: 13/015,558

(22) Filed: Jan. 27, 2011

(51) Int. Cl.
  *H04L 29/06* (2006.01)
(52) U.S. Cl.
  USPC .............. 726/4; 726/2; 726/5; 726/9; 726/20; 726/27; 713/168
(58) Field of Classification Search
  USPC .............. 726/2, 4, 5, 9, 20, 27; 709/217–219; 713/168
  See application file for complete search history.

(56) References Cited

U.S. PATENT DOCUMENTS

| | | | | |
|---|---|---|---|---|
| 6,339,423 | B1* | 1/2002 | Sampson et al. | 715/854 |
| 2010/0198911 | A1* | 8/2010 | Zhang et al. | 709/203 |
| 2010/0269044 | A1* | 10/2010 | Ivanyi et al. | 715/736 |
| 2010/0303059 | A1* | 12/2010 | Itzkovitz et al. | 370/352 |
| 2012/0110086 | A1* | 5/2012 | Baitinger et al. | 709/205 |

\* cited by examiner

*Primary Examiner* — Kambiz Zand
*Assistant Examiner* — Tongoc Tran

(57) ABSTRACT

A system is provided. The system comprises a processor, a memory, and an authorization application stored in the memory that, when executed by the processor, receives a first message from a first client device associated with a first domain, the first message containing a request to emulate a second client device associated with a second domain. The system also determines authorization for the first device to emulate the second device in the second domain. The system also associates an electronic cookie with a browser session initiated by the first device, the electronic cookie associated with access to the second domain. The system also provides the first device authorization to emulate the second device in the second domain using a generic login account wherein the second domain provides the first device limited cross-domain access based on the electronic cookie to targeted information associated with the second device.

19 Claims, 4 Drawing Sheets

IDENTITY ABSTRACTION PROVIDING LIMITED CROSS-DOMAIN ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Customers of large organizations attempting to access the organizations' Internet web sites may have a variety of experiences. Difficulties encountered may comprise inability to access portions of sites to which the customers believe they have rightful access. Customers may receive repeated requests for credentials or may receive inappropriate or confusing error messages. The web site may provide instructions that are incomplete, misleading, or not applicable to the customer. A customer may be trying to access a web site of an organization and enter credentials that the site does not accept for unknown reasons. The site may be difficult for a user to view or otherwise access because of settings in the browser application executing on the user's computer or other device may not support aspects of the web site's presentation or other functionality. Browser settings for graphics may be inappropriate or the browser may not be configured to accept cookies. Adjusting browser settings may be necessary. The browser may not be supported for access to the web site or may not have the technical capabilities needed to access the portions of the web site desired by the user. The user's computer may have been invaded by a virus or malware and the user may need to take corrective action.

SUMMARY

In an embodiment, a system is provided. The system comprises a processor, a memory, and an authorization application stored in the memory that, when executed by the processor, receives a first message from a first client device associated with a first domain, the first message containing a request to emulate a second client device associated with a second domain. The system also determines authorization for the first client device to emulate the second client device in the second domain. The system also associates an electronic cookie with a browser session initiated by the first client device, the electronic cookie associated with access to the second domain. The system also provides the first client device authorization to emulate the second client device in the second domain using a generic login account wherein the second domain provides the first client device limited cross-domain access based on the electronic cookie to targeted information associated with the second client device.

In an embodiment, a processor-implemented method is provided. The method comprises an authorization server receiving an authentication token contained in a first message from a first client device, the authentication token associated with access to a first domain by the first client device. The method also comprises the authorization server determining the identity of a second client device designated in the first message wherein the first message contains a request for the first client device to emulate the second device in a second domain and wherein authorization to emulate is indicated by the authentication token. The method also comprises the authorization server accessing a file describing permitted emulations of client devices associated with the second domain by client devices associated with the first domain. The method also comprises the authorization server determining from the file and from the authentication token that the first client device is authorized to emulate the second client device in the second domain. The method also comprises the authorization server providing the first client device limited authorization to emulate the second client device in the second domain.

In an embodiment, a processor-implemented method is provided. The method comprises an authorization server activating an application programming interface (API) based on receiving a first message from a client device authenticated in a first domain. The method also comprises the authorization server creating a first session cookie for a second domain, the first session cookie permitting the client device limited access to resources in the second domain via a browser session initiated by the client device. The method also comprises the authorization server causing a gateway access component to initialize a cookie provider functionality wherein the cookie provider functionality causes a second session cookie to be created in a third domain based on a browser redirection by the client device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
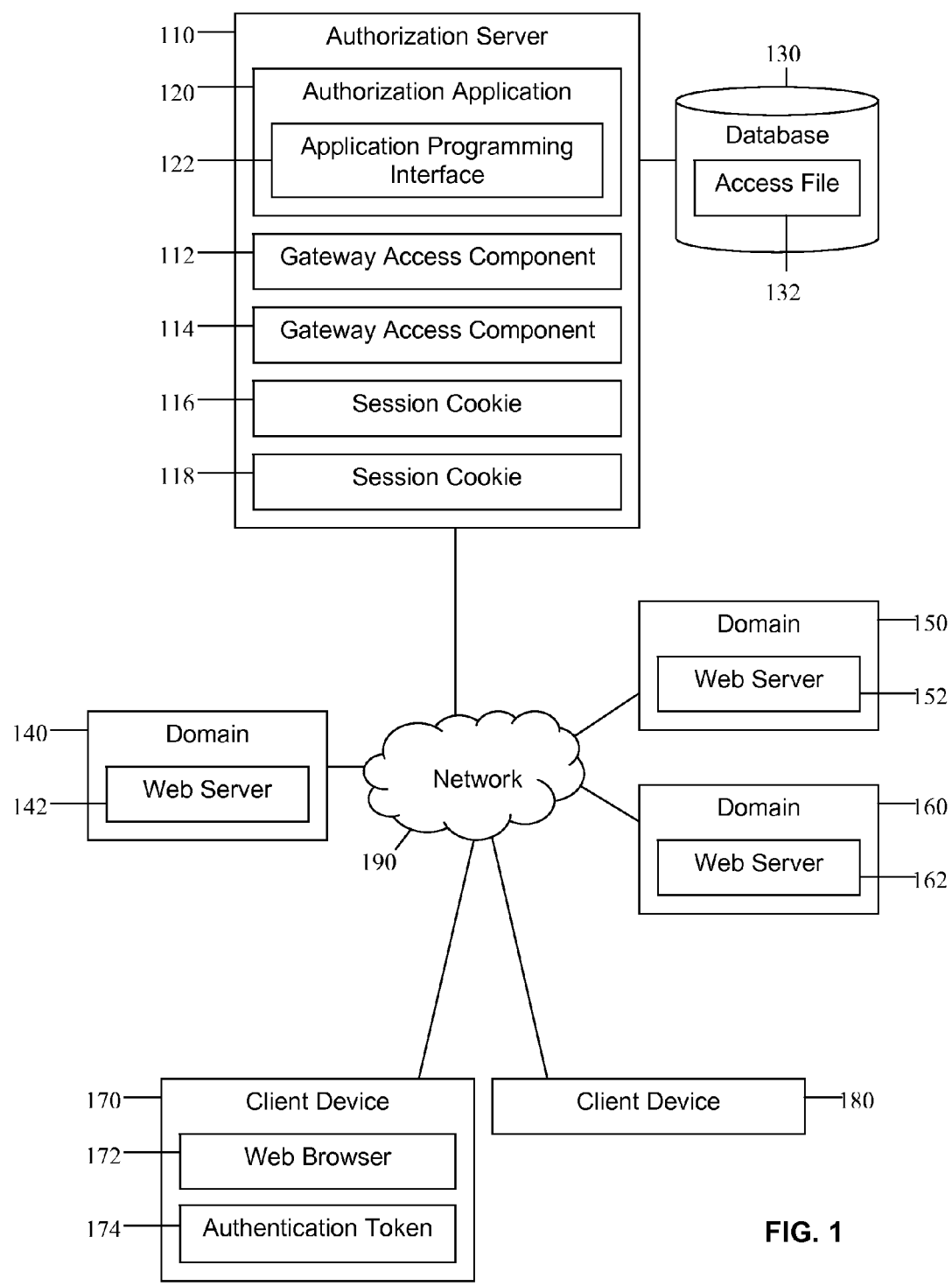
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote a first client device with access normally confined to resources associated with a first domain to be provided limited access to resources available to a second client device associated with a second domain. The identity of the first client device and its user may be abstracted out, providing a generic account limited access to the second domain. The first device is provided the ability to effectively emulate the second device on a limited basis in the second domain. The first device may use the emulation to observe conditions and recreate problems experienced by the second device in the second domain. By taking on aspects of the identity of the second device, the first device may directly view, experience, and gain a better understanding of the problems of the second device. The user of the first device may more readily and effectively develop strategies and solutions to fix the problems.

A large organization, for example a telecommunications services provider, may segregate internal users of its resources from external users of its resources. The provider may segregate resources, for example web sites, used by customer care representatives from other resources used by customers. While some common resources may be used by both care representatives and customers, the interfaces and access paths used by each group may be different and hence the experiences of each group may be difficult to compare for troubleshooting and problem resolution purposes. When a customer experiences a problem with a resource associated with its subscribed communication services, the telecommunications services provider may desire its customer care function to directly observe the problem as experienced by the customer. The present disclosure teaches providing a care representative or other user of the first device the limited ability to emulate the customer in the customer's resource domain. This may promote the representative to directly observe and experience the customer's problems from the customer's perspective. The representative may gain insights not otherwise readily available and may more accurately develop resolution strategies and solutions.

The first client device described above, that may be used by the employee, may present an authentication token to an application provided herein. The token may contain parameters that indicate to the application that the first device may emulate a second device that accesses resources associated with a second domain. The token may provide an instruction to permit the first device to emulate the other device in the second domain to which the first device may not normally have access. After verification, an application programming interface (API) provided by the application may create a session cookie that effectively provides the first device a generic identity and limited access to resources associated with the second domain. The application may leverage the functionality of a gateway access component to associate the session cookie with the first device and with the resources associated with the second domain accessed by the customer. The creation and placement of the session cookie enables the first device to access resources in the second domain, resources with which the second device may be experiencing problems. Customer tools in the second domain to which the first device may not normally have access in its home first domain may become available to the first device in the second domain. The tools may be useful to the first device in diagnosing problems reported by the second device. The application also logs the activities of the first device interacting with resources and other components associated with the second domain. When the first device completes its session navigating about and working with resources associated with the second domain, the session cookie is deleted and the second domain is fully secured from outside access.

Turning now to FIG. 1, a system 100 is described. The system 100 comprises an authorization server 110, gateway access components 112, 114, session cookies 116, 118, an authorization application 120, an application programming interface 122, a database 130, domains 140, 150, 160, client devices 170, 180, and a network 190. The domains 140, 150, 160 may be referred to as the first domain 140, the second domain 150, and the third domain 160, respectively. The client devices 170, 180 may be referred to as the first client device 170 and the second client device 180, respectively.

The authorization server 110 is a computer system. Computer systems are described in detail hereinafter. The authorization application 120 executes on the authorization server 110. The authorization application 120 receives requests from the first client device 170 to be provided limited access to resources associated with the second domain 150. The first client device 170 may provide an authentication token 174 to the authorization application 120 in the request. The authorization application 120 may access a file and verify that the first client device 170 may be permitted limited access to selected resources in the second domain 150. An application programming interface 122 associated with the authorization application 120 may, based on the receipt of the authentication token 174 and the verification, generate a session cookie 116 for use with specific resources associated with the second domain 150. The authentication application 120 may leverage the capabilities of the gateway access component 114 in the placement of the session cookie 116. The session cookie 116 may allow the first client device 170 to emulate the second client device 180 in the second domain 150 on a limited basis. The first client device 170 temporarily may be provided a generic user account by the application programming interface 122 for accessing the second domain 150. The first client device 170 is also provided authorization via the session cookie 116 to view and access resources on a limited basis in the second domain 150 as the resources are visible and accessible in the second domain 150 to the second client device 180. This may promote the user of the first client device 170 to view configurations and problems from the perspective of the user of the second client device 180 and potentially provide assistance. The temporary access provided herein may permit the first client device 170 to effectively experience problems in the second domain 150 as the second client device 180 experiences them. This may permit the user of the first client device 170 to gain insights into the problems and develop solutions that may not be readily possible without the teachings provided herein.

The first client device 170, through its standard authentication, may not be able to access resources in the second domain 150. The first client device 170 may normally authenticate and access resources, for example the web server 142, associated exclusively with the first domain 140. The second client device 180 may likewise authenticate and access resources, for example the web server 152, associated exclusively with the second domain 150. Organizations, as a matter of policy, may segregate user access to different domains 140, 150 and use the segregation to restrict access to resources. This policy, for example, may allow an organization to segregate the access granted to internal users, for example employees, from the access granted to external users, for example customers. The present disclosure teaches that the user of the first client device 170 may access resources in the second domain 150 to provide assistance to view problems experienced by the second client device 180 in the second domain 150. Users and devices, for example the first client device 170, accessing resources associated with the first domain 140 may not normally be provided access to resources associated with the second domain 150. Conversely, users and devices, for example the second client device 180, accessing resources associated with the second domain 150 may not normally be provided access to resources associated with the first domain 140. This segregation of users, devices, and other objects and resources may be of value to an organization seeking to enforce a plurality of security and other policies.

A telecommunications service provider, for example, may provide a plurality of wireless services to customers under subscription arrangements and may sell a plurality of portable and other electronic devices for use in accessing the wireless services. The telecommunications service provider may employ a plurality of customer care representatives that provide remote technical support, product information, and other assistance to customers. The customer care representatives may work in a call center environment and may assist customers in voice or data sessions. The telecommunications service provider may segregate the network-based resources it makes available to internal users from the resources that external users, for example customers, may view and use. The telecommunications service provider may decide to segregate resources used by customer care representatives from resources that its customers may access. The customers may be allowed access to portions of a web site associated with externally facing or publicly accessible domains while the customer care representatives may have access to other portions of the web site that are internally facing and not accessible to the public. In an embodiment, the first domain 140 and the second domain 150 may be associated with separate portions of a single web site or other internet resource wherein the portions are segregated from each other using addressing or other methods. Client devices 170, 180 associated with different domains 140, 150 alternatively may not share some resources on a restricted basis and may instead access separate and fully segregated resources.

When customers encounter problems using web-based and other applications provided by the telecommunications service provider, the customers may report the problems to a customer care function. Because a care representative may not access the web-based customer applications in the same manner that the customer does, and may in some instances not access them at all, the care representative may have difficulty envisioning the problem and may be unable to recreate the problem. Even if the care representative recreates the problem, it may be done in a laboratory or test environment that is sufficiently different from the customer's environment that the care representative's observations, suggestions, and resolution strategies may be of limited value in addressing the customer's problem. The present disclosure teaches a system and methods for allowing the customer care representative to access the environment of the customer on a limited basis. The care representative may access tools specific to the customer environment and may recreate the customer problem as the customer sees and experiences it. The care representative thereby may gain insights into the customer problem that he or she may not otherwise be able to obtain. This may allow the care representative to solve the problem more quickly for the customer and assist in developing a fix such that other customers do not experience the problem in the future. While in the session accessing the customer's view, the care representative may have a limited access to the customer's configuration. The care representative may be unable to access the customer's data, settings, contact lists, and other personalized information that may not be relevant to the problem.

The first client device 170 may be used by the care representative and may be used primarily to access the web server 142 associated with the first domain 140. The second client device 180 may be used by the customer and may be used primarily to access the web server 152 associated with the second domain 150. The web servers 142, 152 may host a plurality of applications available to users provided access to the respective domains 140, 150 of the web servers 142, 152. Although the term "domain" may be used in a plurality of manners in computing and information technology contexts, for example authentication of user logins and virtual gathering of objects, such as computers and printers, in the present disclosure, the use of domain may generally be associated with the naming, organization, and segregation of resources accessible on the Internet and other networks. The telecommunications service provider may choose to direct customer care representatives, for example the user of the first client device 170, to access resources associated with the first domain 140. Access to the first domain 140 may be restricted to employees of the telecommunications service provider. The web server 142 and other resources associated with the first domain 140 may contain confidential and privileged information that the telecommunications service provider may wish not make available to customers and others outside the company. Employees such as customer care representatives likewise may be barred from accessing resources in the second domain 150 that are primarily accessed by customers and parties external to the telecommunications service provider.

The telecommunications service provider may, in some embodiments, use gateway access components 112, 114 to restrict access to some of its network-based resources, for example the first domain 140 and the second domain 150, respectively. The gateway access component 112 may comprise a web access management system with which the first client device 170 registers and clears its rights associated with the first domain 140 before being permitted access to the first domain 140, for example the web server 142. The gateway access component 114 similarly may allow the second client device 180 access to the second domain 150 after verifying the privileges of the second client device 180 for this access. In an embodiment, the gateway access components 112, 114 may be commercially available software packages that the authorization application 120 may leverage to provide the limited cross-domain access described herein. In an embodiment, one function of the gateway access components 112, 114 may be to furnish cookie provider functionality that may be drawn upon by components of the system 100 described herein. While FIG. 1 depicts the gateway access components 112, 114 as components of the authorization server 110, in an embodiment the gateway access components 112, 114 may execute on another computer or other device.

When a care representative using the first client device 170 begins working, the care representative may access an internally available web or landing page used by a plurality of care representatives for tools and information. The first client device 170 may provide authentication credentials to the gateway access component 112 to receive full access to the internal web page. The web page may be accessible from the web server 142 associated with the first domain 140. Once cleared by the gateway access component 112, the first client device 170 may be provided access to a plurality of tools, information sources, and database records to assist customers with problems. The present disclosure also teaches that the first client device 170 may receive a selectable link, icon, or other object in the web page that may activate some of the functionality taught herein. When the user of the first client device 170 activates the link or icon, a message may be sent to the authorization server 110. The message may contain the authentication token 174 or other information that indicates to the authentication application 120 executing on the authorization server 110 that the user of the first client device 170 seeks to access resources associated with a domain other than the care representative's home first domain 140. The message also may contain a designation of the second client device 180 and/or its user associated with the second domain 150 that the care representative using the first client device 170 may seek to emulate or otherwise assist.

The authentication application 120 receives the message from the first client device 170 and recognizes the authentication token 174 indicating that the first client device 170 seeks to be provided access to resources associated with the second domain 150. The authentication application 120 also recognizes that the message from the first client device 170 identifies the second client device 180 and/or its user that the care representative may seek to emulate in browsing about resources associated with the second domain 150. The authentication application 120 may access an access file 132 stored in the database 130. The access file 132 may confirm that the first client device 170 is permitted limited access to resources associated with the second domain 150. The access file 132 also may describe at least one client device, for example the second client device 180, that the first client device 170 may be permitted to emulate on a limited basis in accessing resources associated with the second domain 150, for example the web server 152. While the first client device 170 may be provided the capability to effectively emulate the second client device 180 on a limited basis, the first client device 170 is temporarily provided a generic login account by the application programming interface 122 for access to the second domain 150. The access file 132 that describes the authorization for the first client device 170 for this access may be provided in the extensible markup language (XML) format.

The generic login enables the first client device 170 to receive temporary and limited access to the second domain 150 for the defined and narrow purposes of viewing and accessing specific resources available in the second domain 150 to the second client device 180. The generic login does not provide further privileges beyond the limited access described herein. The account associated with the generic login does not survive the closing of the session in which the first client device 170 presents the authentication token 174 and receives the session cookie 116. The generic login account does not uniquely represent an individual user and instantiations of the generic login account may be distributed to multiple authorized users of the first client device 170 at a single time. When the user of the first client device 170 presents the authentication token 174 indicating an intention to invoke the processes described herein to receive limited access to the second domain 150, the user is temporarily provided an instantiation of the generic login account and thereby allowed limited access to some of the areas of the second domain 150 that the user of the second client device 180 normally accesses. The session cookie 116 placed by the authorization application 120 and the gateway access component 112 describes the limited access to the resources associated with the second client device 180. When a user of the first client device 170 completes his or her tasks assisting the user of the client device 180 and closes his or her browser session, the instantiation of the generic login account for the user of the first client device 170 is deleted and is not reused.

When submitting the authentication token 174, the first client device 170 identifies the second client device 180 that is to receive assistance. The authorization application 120 reads the access file 132 stored in the database 130 to determine the resources accessible by the second client device 180 that are to be made temporarily available to the first client device 170. The authorization application 120 links these resources accessible by the second client device 180 to the session cookie 116 temporarily provided to the first client device 170. The combination of the generic login account and the targeted information of the second client device 180 and their association with limitations on access may promote simplicity of management of the system 100 and reduce risk of unauthorized access. The combination also promotes ease of examination and appropriate use of the targeted information as well as orderly transition out of the second domain 150 by the first client device 170 upon completion of its tasks.

The authentication application 120 may access the application programming interface 122 approximately coincident with reading the access file 132. Once it is determined that the first client device 170 is authorized to access resources associated with the second domain 150 and may emulate the second client device 180 in doing so, the authorization application 120 may cause the application programming interface 122 to create the session cookie 116 for this purpose. The application programming interface 122 creates the session cookie 116, that may be referred to as SessionCookie, for use by the first client device 170 in the second domain 150. This action may take place with the participation or cooperation of the gateway access component 114 whose function is to regulate access to the second domain 150 in a manner similar to how the gateway access component 112 may regulate access to the first domain 140. The session cookie 116 may be placed in a browser session instantiated by the first client device 170 using the web browser 172.

The presence of the session cookie 116 in the browser session of the first client device 170 allows the first client device 170 to access the web server 152 and other resources associated with the second domain 150. When the first client device 170 receives this limited access to the second domain 150, the first client device 170 may be temporarily provided some of the identifying parameters of the second client device 180 that the first client device 170 may use to effectively emulate the second client device 180 in the second domain 150 and provide useful assistance. The functionality of the authentication application 120 invoking the application programming interface 122 and leveraging the gateway access component 114 that effectively guards the second domain 150 may allow access to portlets or access points to the second domain 150. The portlets may be associated with resources accessible in the second domain 150, for example the web server 152, to which the second client device 180 has access.

In an embodiment, the user of the second client device 180, that may be a customer of the telecommunications service provider, may be experiencing difficulty with accessing the web server 152. The web server 152 may be used by customers of the telecommunications service provider to access various services under their subscription arrangements. The web server 152 may provide applications that the second client device 180 may download and install. The web server 152 may provide services that the second client device 180 may access remotely and use once or on a repeated basis. The web server 152 may provide connectivity to sources of information or services provided by other servers or components within or outside the telecommunications service provider. The user of the second client device 180 in interacting with the web server 152 in any of a plurality of manners may be experiencing difficulty. The user may misunderstand instructions or instructions may be nonexistent or poorly documented. The second client device 180 may have received an error message or may have difficulty signing in or otherwise receiving permission to access services provided by the web server 152.

When the user of the second client device 180 contacts the customer care function of the telecommunications service provider, the user may report the problem. While the care representative assigned to work on the problem may understand the problem and may have worked on the problem previously, the care representative may be unable to directly observe or experience the problem as the user of the second client device 180 is observing and experiencing the problem. Organizations such as the telecommunications service provider may maintain separation between resources used by internal and external users as discussed previously. The present disclosure provides the care representative using the first client device 170 the ability to observe and experience what the customer using the second client device 180 is experiencing. This may contrast with the first client device 170 attempting to recreate the problem in a lab or simulated environment wherein results may not be reliable. Tools available in the second domain 150 may not be available in the first domain 140. By permitting the first client device 170 to emulate or effectively take the place of the second client device 180 in accessing the web server 150 in the second domain 150, the authentication application 120 allows the care representative or other user of the first client device 170 to directly experience the problem reported by the user of the second client device 180. This may promote a more rapid and targeted resolution of the problem.

When the first client device 170 is provided the ability to emulate the second client device 180, the first client device 170 may be provided limited access to the files and other objects associated with the second client device 180. The data, permissions, rights, contact lists and other items that have been created by or otherwise associated with the second client device 180 may not be available to the first client device 170 during its session in the second domain 150 unless needed to solve the reported problem. The first client device 170 is provided a generic login to the second domain 150 and limited access to tools available in the second domain 150. Such tools may be unaware that the first client device 170 is effectively visiting from a different domain and do not differentiate between first client device 170 and the second client device 180.

As long as the session cookie 116 provided by the authentication application 120 leveraging the gateway access component 114 remains associated with the browser session, the first client device 170 may continue working on the limited basis with the web server 152 and other resources associated with the second domain 150. If the user of the first client device 170 closes the browser session or the browser session is closed for some other reason, the session cookie may be deleted and the first client device 170 may be disconnected from resources associated with the second domain 150.

In an embodiment, the telecommunications service provider may provide a plurality of web sites and other online resources for subscribers other customers to access. While the web server 152 generally accessed by customers may be associated with the second domain 150, other resources accessed by customers may be associated with other domains, for example the third domain 160 that provides access to a web server 162. Not all resources accessed by customers, for example web servers, are associated with a single domain. A webserver1.com and a webserver2.com may, for example, both be accessible to the second client device 180 through its subscription with the telecommunications service provider but be associated with different and separate domains 150, 160. The care representative using the first client device 170 may need to access more than one web server 152, 162 that may be associated with the domains 150, 160, respectively.

The present disclosure promotes the first client device 170 transitioning from the web server 152 to the web server 162 and vice versa without taking extra action as long as the first client device 170 maintains its browser session. When the first client device 170 causes its browser session to transition from the web server 152 to the web server 162, for example, the authentication application 120 may detect this action and cause the gateway access component 114 to activate cookie provider functionality. The cookie provider functionality, that may interact with a web agent functionality also associated with the gateway access component 114, may cause the session cookie 116 to be instantiated for the third domain 160 where the web server 162 may be accessed. In an embodiment, the session cookie 116 may be replicated in the third domain 160 as the session cookie 118. The session cookie 116 instantiated earlier and associated with the browser session when the first client device 170 initially accessed the second domain 150 is not deleted, providing the user of the first client device 170 the flexibility to redirect its browser session back and forth between the web server 162 and the web server 152.

The authentication application 120 also logs the activity of the first client device 170 during its session with the second domain 150 and the third domain 160 if applicable. The activity logging may be useful when analyzing and auditing actions taken by the first client device 170 in solving a problem and developing practices for solving or circumventing future problems. When the first client device 170 terminates its browser session, any session cookie 116, 118 created for access to the second domain 150 and the third domain 160 is deleted. This may occur by action of an application programming interface not shown in FIG. 1.

The present disclosure teaches the authentication application 120 and other components providing a custom application programming interface 122 and leveraging the functionality of the gateway access component 114 to promote the first client device 170 receiving limited specialized access to the second domain 150 and the third domain 160. In an embodiment, the system 100 and the methods taught herein may be referred to as an abstraction service or an abstraction layer. The authentication application 120 may abstract out the identity of the first client device 170 and allow it to be presented to the second domain 150 and its tools under an instantiation of the generic login account as enabled by the session cookie 116. This permits the first client device 170 to temporarily take on selected properties of the second client device 180 that it seeks to assist.

The present disclosure has used an example describing a customer of a telecommunications service provider encountering difficulties with a resource and receiving assistance from a care representative to elucidate the system and methods taught herein. In an embodiment, the organization providing a resource accessed by the client device 180 may not be a telecommunications service provider and may be another organization or provider of web services such as a manufacturer, a utility, a transportation company, a financial services or health care provider, or a retailer, for example. The organization alternatively may not be a commercial entity and instead may be a governmental or other public agency, a non-profit organization, or a university or other educational provider. In an embodiment, the first device 170 may not be used by a user attempting to assist the user of the second device 180 in accessing a resource or solve a problem and instead may have other legitimate and lawful motivation for emulating the second device 180 and accessing resources associated with the second domain 150 and the third domain 160. In an embodiment, the client device 170 may access the functionality taught herein to emulate the client device 180 without the knowledge or authorization of the user of the client device 180.

The network 190 promotes communication between the components of the system 100. The network 190 may be any communication network including a public data network (PDN), a public switched telephone network (PSTN), a private network, and/or a combination.

Figure 2:
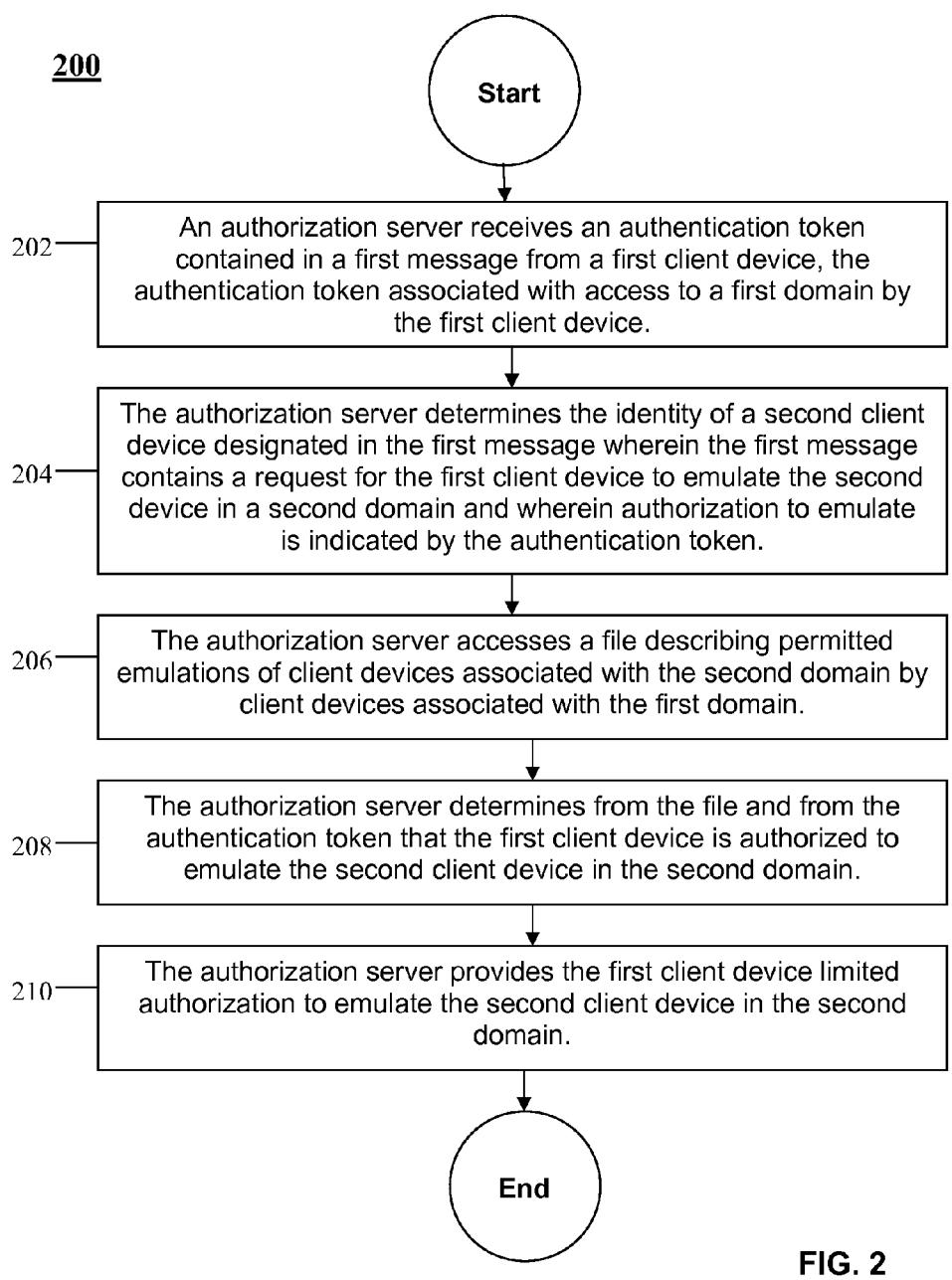
FIG. 2 is a flow chart illustrating a method according to an embodiment of the disclosure.

Turning now to FIG. 2, a processor-implemented method 200 is provided. Beginning at block 202, an authorization server receives an authentication token contained in a first message from a first client device, the authentication token associated with access to a first domain by the first client device. At block 204, the authorization server determines the identity of a second client device designated in the first message wherein the first message contains a request for the first client device to emulate the second device in a second domain and wherein authorization to emulate is indicated by the authentication token.

At block 206, the authorization server accesses a file describing permitted emulations of client devices associated with the second domain by client devices associated with the first domain. At block 208, the authorization server determines from the file and from the authentication token that the first client device is authorized to emulate the second client device in the second domain. At block 210, the authorization server provides the first client device limited authorization to emulate the second client device in the second domain.

Figure 3:
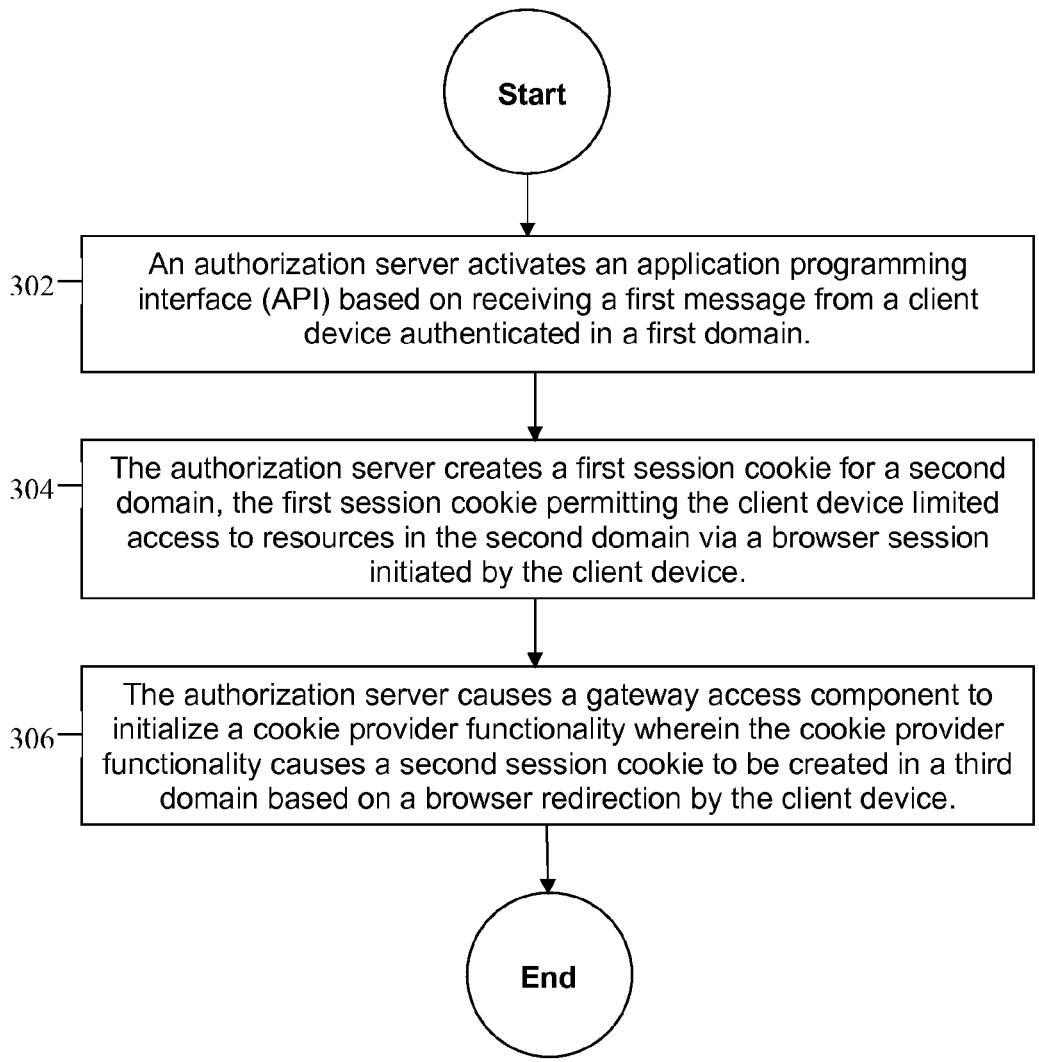
FIG. 3 is a flow chart illustrating a method according to an embodiment of the disclosure.

Turning now to FIG. 3, a processor-implemented method 300 is provided. Beginning at block 302, an authorization server activates an application programming interface (API) based on receiving a first message from a client device authenticated in a first domain.

At block 304, the authorization server creates a first session cookie for a second domain, the first session cookie permitting the client device limited access to resources in the second domain via a browser session initiated by the client device. At block 306, the authorization server causes a gateway access component to initialize a cookie provider functionality wherein the cookie provider functionality causes a second session cookie to be created in a third domain based on a browser redirection by the client device.

Figure 4:
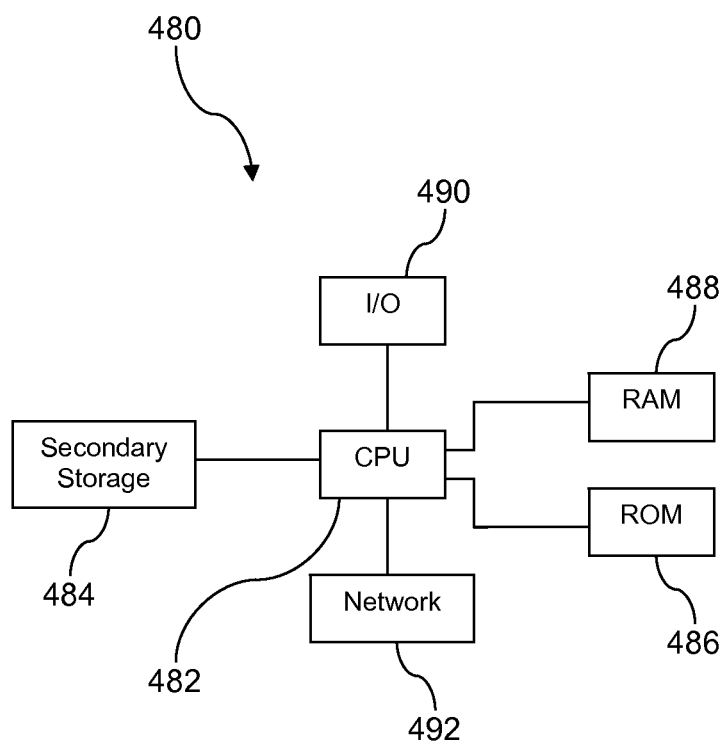
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cross-domain access authorization system, comprising:
   a processor;
   a memory; and
   an authorization application stored in the memory that, when executed by the processor,
      receives a message from an employee client device associated with an employee domain indicating that the employee client device seeks cross-domain access to one or more resources in a customer domain related to a problem experienced by a customer client device in the customer domain, wherein the message contains a request to emulate the customer client device in the customer domain,
      determines authorization for the employee client device to emulate the customer client device in the customer domain,
      in response to the authorization, associates an electronic cookie with a browser session initiated by the employee client device, wherein the electronic cookie allows the employee client device to emulate the customer client device in the customer domain on a limited basis including providing the employee client device limited cross-domain access to the one or more resources in the customer domain related to the problem experienced by the customer client device in the customer domain, and provides the employee client device authorization via the electronic cookie to emulate the customer client device in the customer domain using a generic login account, wherein the customer domain provides the employee client device the limited cross-domain access to the one or more resources in the customer domain related to the problem experienced by the customer client device in the customer domain based on the electronic cookie.

2. The system of claim 1, wherein the authorization application receives an instruction in the message that causes the authorization application to activate an application programming interface (API).

3. The system of claim 2, wherein the activation of the application programming interface (API) causes the electronic cookie to be associated with the browser session initiated by the employee client device.

4. The system of claim 1, wherein the message contains an authentication token describing the association of the employee client device with the employee domain.

5. The system of claim 4, wherein the authentication token additionally indicates access privileges for the employee client device in the customer domain.

6. The system of claim 1, wherein the one or more resources available in the customer domain for access by the employee client device comprise at least a first web site.

7. The system of claim 1, wherein the authorization application deletes the electronic cookie when the employee client device terminates the browser session.

8. The system of claim 1, wherein the employee client device is associated with a customer care representative and the customer client device is associated with a user of services supported by the customer care representative.

9. A processor-implemented method for authorizing limited cross-domain access, comprising:
  receiving, by an authorization server, a message from an employee client device associated with an employee domain indicating that the employee client device seeks cross-domain access to one or more resources in a customer domain related to a problem experienced by a customer client device in the customer domain, wherein the message comprises an authentication token associated with access to the employee domain by the employee client device and the message contains a request for the employee client device to emulate the customer client device in the customer domain;
  determining, by the authorization server, an identity of the customer client device based on the message;
  accessing, by the authorization server, a file describing permitted emulations of customer client devices associated with the customer domain by employee client devices associated with the employee domain;
  determining, by the authorization server, from the file and from the authentication token that the employee client device is authorized to emulate the customer client device in the customer domain;
  in response to the authorization, associating, by the authorization server, an electronic cookie with a browser session initiated by the employee client device, wherein the electronic cookie allows the employee client device to emulate the customer client device in the customer domain on a limited basis including providing the employee client device limited-cross domain access to the one or more resources in the customer domain related to the problem experienced by the customer client device in the customer domain; and
  providing, by the authorization server, the employee client device authorization via the electronic cookie to emulate the customer client device in the customer domain using a generic login account, wherein the customer domain provides the employee client device the limited cross-domain access to the one or more resources in the customer domain related to the problem experienced by the customer client device in the customer domain based on the electronic cookie.

10. The method of claim 9, wherein the limited cross-domain access enables the employee client device to observe conditions experienced in the customer domain by the customer client device.

11. The method of claim 9, wherein the limited cross-domain access enables the employee client device to recreate and address problem scenarios experienced in the customer domain by the customer client device.

12. The method of claim 9, wherein the browser session is initiated to provide the message to the authorization server, and wherein the electronic cookie is associated with access to the customer domain.

13. The method of claim 12, wherein an access gateway component associated with the customer domain detects the association of the electronic cookie with the browser session.

14. The method of claim 12, wherein the association of the electronic cookie with the browser session enables access for the employee client device to at least one portlet associated with the customer domain, the portlet providing access to at least one web-based service accessed by the customer client device.

15. The method of claim 9, further comprising logging, by the authorization server, activity of the employee client device in the customer domain in a database.

16. A processor-implemented method for authorizing limited cross-domain access, comprising:
  activating, by an authorization server, an application programming interface (API) based on receiving a message from an employee client device authenticated in an employee domain indicating that the employee client device seeks cross-domain access to a plurality of resources in a plurality of customer domains related to a problem experienced by a customer client device in the plurality of customer domains;
  creating, by the authorization server, a first session cookie for a first of the plurality of customer domains, wherein the first session cookie permits the employee client device to emulate the customer client device in the first of the plurality of customer domains on a limited basis including providing the employee client device limited cross-domain access to one or more of the plurality of resources in the first of the plurality of customer domains related to the problem experienced by the customer client device in the first of the plurality of customer domains via a browser session initiated by the employee client device;
  providing, by the authorization server, the employee client device authorization via the first session cookie to emulate the customer client device in the first of the plurality of customer domains using a generic login account, wherein the first of the plurality of customer domains provides the employee client device the limited cross-domain access to the one or more resources in the first of the plurality of customer domains related to the problem experienced by the customer client device in the first of the plurality of customer domains based on the first session cookie;

causing, by the authorization server, a gateway access component to initialize a cookie provider functionality, wherein the cookie provider functionality causes a second session cookie to be created in a second of the plurality of customer domains based on a browser redirection by the employee client device, wherein the second session cookie permits the employee client device to emulate the customer client device in the second of the plurality of customer domains on a limited basis including providing the employee client device limited cross-domain access to one or more of the plurality of resources in the second of the plurality of customer domains related to the problem experienced by the customer client device in the second of the plurality of customer domains via the browser redirection by the employee client device; and providing, by the authorization server, the employee client device authorization via the second session cookie to emulate the customer client device in the second of the plurality of customer domains, wherein the second of the plurality of customer domains provides the employee client device the limited cross-domain access to the one or more resources in the second of the plurality of customer domains related to the problem experienced by the customer client device in the second of the plurality of customer domains based on the second session cookie.

17. The method of claim 16, further comprising:

receiving, by the gateway access component, a second message that the employee client device redirected the browser session from the first of the plurality of customer domains to the second of the plurality of customer domains;

causing, by the gateway access component, the cookie provider functionality to create the second session cookie in the second of the plurality of customer domains; and receiving, by the customer client device, access to the second of the plurality of customer domains based on the creation of the second session cookie in the second of the plurality of customer domains.

18. The method of claim 17, wherein the first session cookie remains associated with the first of the plurality of customer domains after the second session cookie is created in the second of the plurality of customer domains, and wherein the first session cookie is accessed in the event the employee client device redirects the browser session from the second of the plurality of customer domains to the first of the plurality of customer domains.

19. The method of claim 17, wherein the first session cookie and the second session cookie are deleted in the event the employee client device terminates the browser session.

\* \* \* \* \*